US012795062B2

(12) United States Patent
Maeda

(10) Patent No.: US 12,795,062 B2
(45) Date of Patent: Nov. 10, 2026

(54) DISPLAY CONTROL DEVICE AND DISPLAY CONTROL METHOD WITH DISPLAY CONTROL FOR VR VIDEO BASED ON OPERATOR STATUS

(71) Applicant: CANON KABUSHIKI KAISHA, Tokyo (JP)

(72) Inventor: Ryo Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 18/598,161

(22) Filed: Mar. 7, 2024

(65) Prior Publication Data

US 2024/0314288 A1 Sep. 19, 2024

(30) Foreign Application Priority Data

Mar. 17, 2023 (JP) ................................ 2023-043237

(51) Int. Cl.
*H04N 13/332* (2018.01)
*G02B 27/01* (2006.01)
*H04N 13/366* (2018.01)
*H04N 23/68* (2023.01)

(52) U.S. Cl.
CPC ....... *H04N 13/332* (2018.05); *G02B 27/0172* (2013.01); *H04N 13/366* (2018.05); *H04N 23/683* (2023.01); *G02B 2027/0138* (2013.01)

(58) Field of Classification Search
CPC ........ G02B 2027/0138; G02B 27/0172; H04N 13/332; H04N 13/344; H04N 13/366; H04N 23/63; H04N 23/6812; H04N 23/683; A63F 13/335; A63F 13/5258; A63F 13/533; A63F 13/86; A63F 2300/303; A63F 2300/407; A63F 2300/8082; G06F 3/013; G06F 3/0346
See application file for complete search history.

(56) References Cited

U.S. PATENT DOCUMENTS 9,996,308 B2 * 6/2018 Park .......................... G06F 3/14
11,181,990 B2 * 11/2021 Marks .................. A63F 13/533
11,706,378 B2 7/2023 Tanaka
12,231,781 B2 * 2/2025 Nakakura ............ H04N 21/816
12,471,841 B1 * 11/2025 Allison ................ A61B 5/7465
2005/0008332 A1 * 1/2005 Ogikubo .......... H04N 21/47217 386/323

(Continued)

FOREIGN PATENT DOCUMENTS

JP 2021-180425 A 11/2021

*Primary Examiner* — Antoinette T Spinks
(74) *Attorney, Agent, or Firm* — Venable LLP

(57) ABSTRACT

A display control device includes an acquiring unit, a processing unit, a control unit, and a display control unit. The acquiring unit acquires a VR video captured by an imaging device. The processing unit performs, on a live view image of the VR video, reducing processing to reduce probability of generating a specific symptom to a user viewing the live view image. The control unit controls a degree of the reducing processing on the live view image based on whether or not the user is an operator of the imaging device, in a case where movement of the imaging device is detected. The display control unit controls a display to display an image obtained after the reducing processing is performed on the live view image, in a case where the reducing processing is performed on the live view image.

19 Claims, 10 Drawing Sheets

(56) References Cited

U.S. PATENT DOCUMENTS

| | | | | |
|---|---|---|---|---|
| 2015/0130839 | A1* | 5/2015 | Kasahara | G06F 3/0304<br>345/633 |
| 2017/0072305 | A1* | 3/2017 | Watanabe | G06F 3/04842 |
| 2017/0123744 | A1* | 5/2017 | Park | G06F 3/14 |
| 2017/0269713 | A1* | 9/2017 | Marks | A63F 13/86 |
| 2018/0260187 | A1* | 9/2018 | Yasuda | H04M 11/06 |
| 2021/0335032 | A1* | 10/2021 | Araújo | G06T 7/20 |
| 2023/0076335 | A1 | 3/2023 | Nakakura | |
| 2026/0128805 | A1* | 5/2026 | Guenther | H04B 17/23 |
| 2026/0129281 | A1* | 5/2026 | Xu | H04N 23/63 |

* cited by examiner

DISPLAY CONTROL DEVICE AND DISPLAY CONTROL METHOD WITH DISPLAY CONTROL FOR VR VIDEO BASED ON OPERATOR STATUS

BACKGROUND OF THE INVENTION

Field of the Invention

The present invention relates to a display control device that controls display of a VR video, and to a display control method thereof.

Description of the Related Art

In recent years, a VR content such as a VR image (VR still image or VR video) acquired by using a VR camera or the like is viewed via live streaming. To view the VR content, a head mounted display (HMD) or the like is used.

In some cases, when viewing a VR content using HMD, a view point of a viewer may be unintendedly moved (e.g., view point moving due to moving of VR camera). In such a case, the viewer may experience a sick feeling called "virtual reality sickness (VR sickness)".

According to Japanese Patent Application Publication No. 2021-180425, when a robot equipped with a VR camera at a remote area is controlled, VR video is temporarily paused, or the VR video is temporarily replaced with single color image data, while the robot is moving. In other words, Japanese Patent Application Publication No. 2021-180425 discloses an example of a technique to reduce VR sickness by performing video processing of reducing a sense of immersion.

In a case of creating a VR content, an operator of a camera may operate the VR camera while checking the VR video displayed on the HMD. In this case, a position, direction and the like are adjusted in the image capturing, for example. In some cases, a plurality of viewers (e.g., other users creating the VR contents, or viewers of live streaming) other than the operator may view the VR video captured by the same VR camera, using HMD or the like of each viewer.

In this case, if the processing of reducing a sense of immersion of the VR video is performed to reduce the VR sickness of the viewers, the operator cannot check the video quickly due to the influence of change in angle-of-view or composition of the camera, even if the VR sickness of the viewers can be reduced. This means that the operator may miss the chance of image capturing.

Further, if a VR video for which the processing of reducing the sense of immersion is not performed (or for which the processing of reducing the sense of immersion is weakly performed) is displayed for the operator who desires to quickly check the video, VR sickness may be generated in the viewers of the VR image other than the operator, due to the unintended movement of the view point.

SUMMARY OF THE INVENTION

With the foregoing in view, it is an object of the present invention to provide a technique to display VR video that is appropriate for each user viewing the VR image.

An aspect of the present invention is a display control device including: a processor; and, a memory storing a program which, when executed by the processor, causes the processor to: acquire a VR video captured by an imaging device, detect movement of the imaging device, perform, on a live view image of the VR video, reducing processing to reduce probability of generating a specific symptom to a user viewing the live view image; control a degree of the reducing processing on the live view image based on whether or not the user is an operator of the imaging device, in a case where movement of the imaging device is detected, and control a display to display an image obtained after the reducing processing is performed on the live view image, in a case where the reducing processing is performed on the live view image.

An aspect of the present invention is a display control method, including: an acquiring step of acquiring a VR video captured by an imaging device; a detecting step of detecting movement of the imaging device; a processing step of performing, on a live view image of the VR video, reducing processing to reduce probability of generating a specific symptom to a user viewing the live view image; a control step of controlling a degree of the reducing processing on the live view image based on whether or not the user is an operator of the imaging device, in a case where movement of the imaging device is detected in the detecting step; and a display control step of controlling a display unit to display an image obtained after the reducing processing is performed on the live view image, in a case where the reducing processing is performed on the live view image.

Further features of the present invention will become apparent from the following description of exemplary embodiments with reference to the attached drawings.

DESCRIPTION OF THE EMBODIMENTS

Embodiments of the present invention will now be described with reference to the accompanying drawings.

Figure 1A:
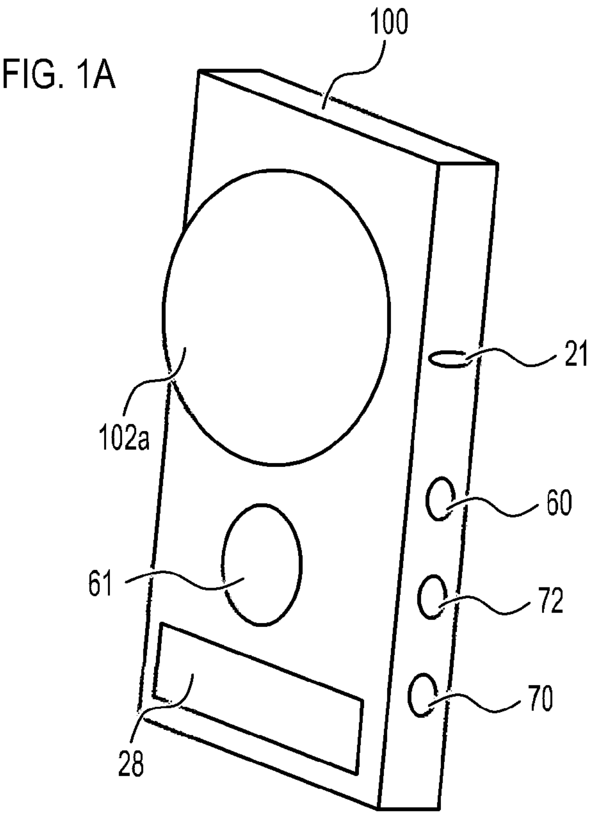
FIGS. 1A to 1C are diagrams for describing a digital camera.
Figure 1B:
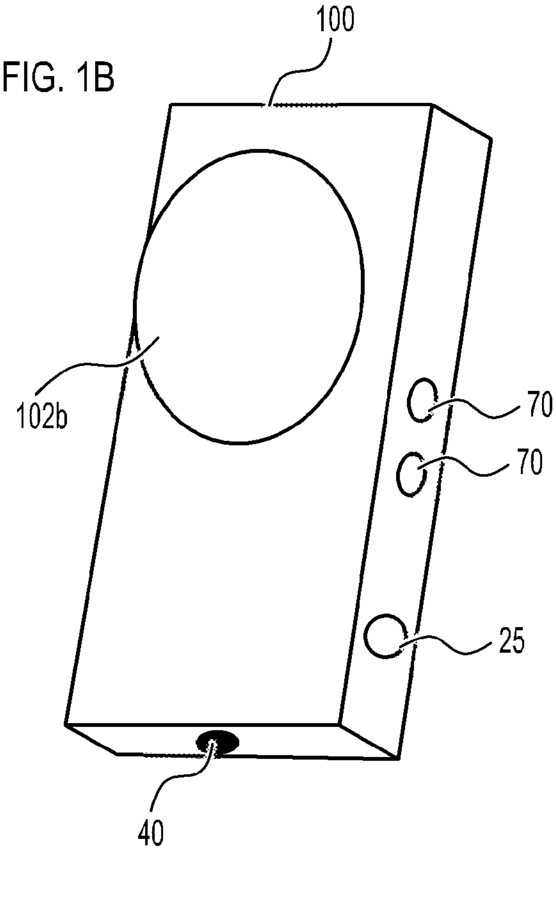

FIG. 1A is a front perspective view (external view) of a digital camera 100 (imaging device) which is an electronic apparatus. FIG. 1B is a rear perspective view (external view) of the digital camera 100. The digital camera 100 is an omnidirectional camera (full-spherical camera).

A barrier 102*a* is a protective window of an imaging capturing lens 103*a* for protecting a "camera unit a", of which image capturing range is a front side of the digital camera 100. The barrier 102*a* may be an outer side surface of the image capturing lens 103*a* itself. The "camera unit a" is a wide angle camera, of which the image capturing range is a wide range of at least 180° vertically and horizontally, in the front side of the digital camera 100. A barrier 102*b* is a protective window of an image capturing lens 103*b* for protecting a "camera unit b", of which the image capturing range is the rear of the digital camera 100. The barrier 102*b* may be an outer side surface of the image capturing lens 103*b* itself. The "camera unit b" is a wide angle camera, of which the image capturing range is a wide range of at least 180° vertically and horizontally in the rear side of the digital camera 100.

A display unit 28 is a display unit to display various information. A shutter button 61 is an operation unit to instruct image capturing. A mode selection switch 60 is an operation unit to switch various modes. A connection I/F 25 is a connector to connect a connection cable (a cable to connect such an external device as a smartphone, a personal computer and a television) and the digital camera 100. An operation unit 70 includes operation members (e.g., various switches, buttons, a dial, and a touch sensor) to receive various operations performed by the user. A power supply switch 72 is a push button to switch the power supply ON/OFF.

Alight-emitting unit 21 is a light-emitting member, such as a light-emitting diode (LED). The light-emitting unit 21 notifies the user on various states of the digital camera 100 using light-emitting patterns and light-emitting colors. A fixing unit 40 is a tripod screw hole, for example. The fixing unit 40 is a member used to securely install the digital camera 100 on such a fixing instrument as a tripod.

Figure 1C:
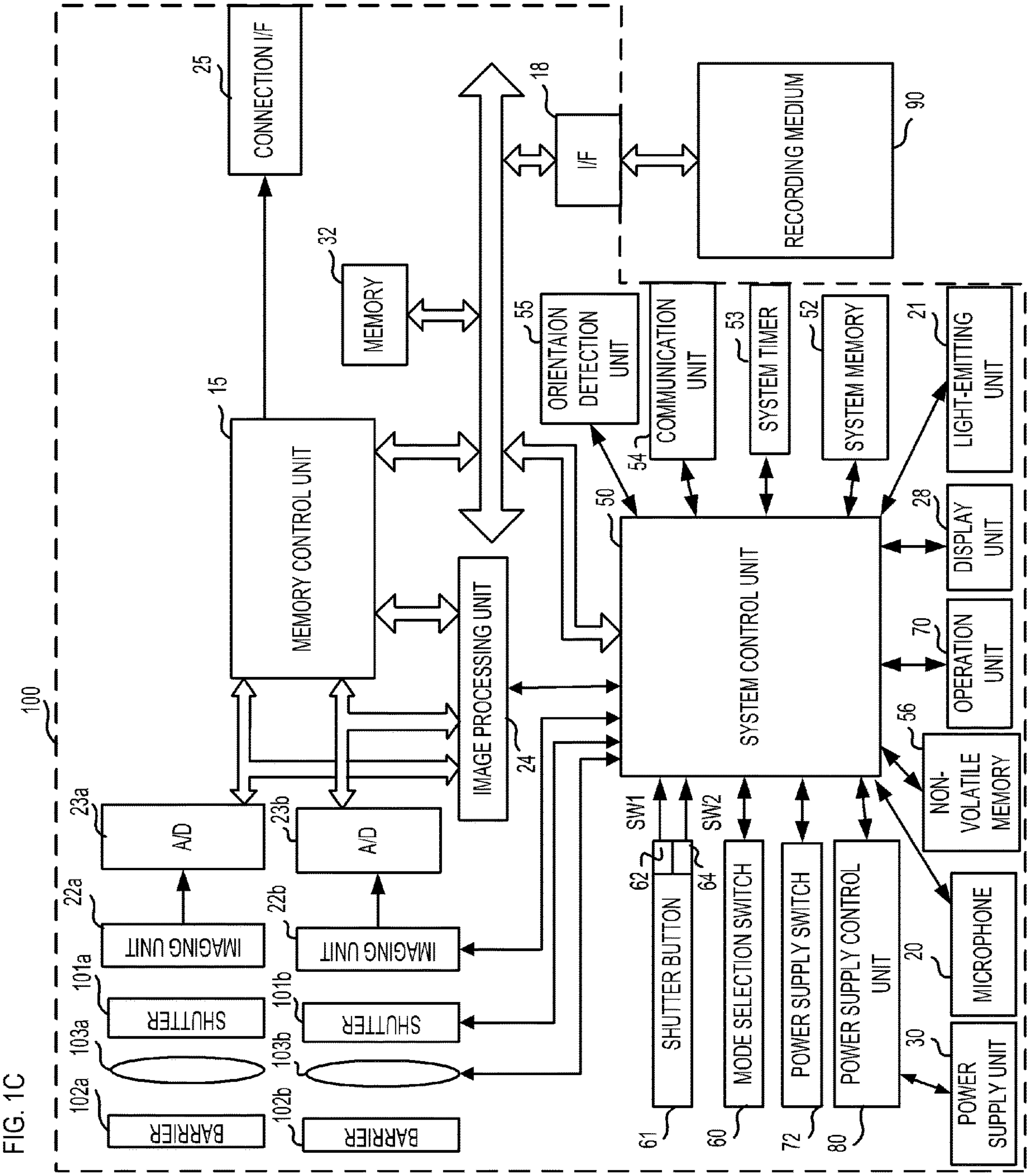

FIG. 1C is a block diagram depicting a configuration example of the digital camera 100. A barrier 102*a* covers an imaging system of a "camera unit a", which includes the image capturing lens 103*a*, so as to prevent contamination of and damage to the imaging system (including the image capturing lens 103*a*, a shutter 101*a*, and an imaging unit 22*a*). The imaging capturing lens 103*a* is a lens group which includes a zoom lens and a focus lens. The image capturing lens 103*a* is a wide angle lens. The shutter 101*a* has an aperture function to adjust the incident light quantity of the subject light to the imaging unit 22*a*. The imaging unit 22*a* is an image pickup element constituted of a CCD, a CMOS element, or the like to convert an optical image into electric signals. An A/D convertor 23*a* converts analog signals outputted from the imaging unit 22*a* into digital signals.

The barrier 102*b* covers an imaging system (including the image capturing lens 103*b*, a shutter 101*b*, and an imaging unit 22*b*) of a "camera unit b" which includes the image capturing lens 103*b*, so as to prevent contamination of and damage to the imaging system. The image capturing lens 103*b* is a lens group which includes a zoom lens and a focus lens. The image capturing lens 103*b* is a wide angle lens. The shutter 101*b* has an aperture function to adjust the incident light quantity of the subject light to the imaging unit 22*b*. The imaging unit 22*b* is an image pickup element constituted of a CCD, a CMOS element, or the like to convert an optical image into electric signals. An A/D convertor 23*b* converts analog signals outputted from the imaging unit 22*b* into digital signals.

A VR image is captured by the imaging unit 22*a* or the imaging unit 22*b*. The VR image here refers to an image that can be VR-displayed. The VR image includes an omnidirectional image captured by an omnidirectional camera, and a panoramic image having an image range (effective image range) that is wider than a display range that can be displayed on the display unit at the same time. The VR image also includes not only a still image, but also a moving image (video) and a live view image (an image acquired from the camera in near real-time). The VR image has an image range (effective image range) of a maximum 360° visual field in the longitudinal direction (vertical angle, angle from zenith, elevation/depression angle, altitude angle), and a maximum 360° visual field in the lateral direction (horizontal angle, azimuth angle). The VR image includes an image having a wide angle-of-view (visual field range) that is wider than an angle of view which a standard camera can capture, or an image having an image range (effective image range) that is wider than the display range which can be displayed on the display unit at the same time, even if the image range is less than 360° in the longitudinal direction and less than 360° in the lateral direction. For example, an image captured by an omnidirectional camera, which can capture an image of a subject in a visual field (angle-of-view) that is 360° in the lateral direction (horizontal angle, azimuth angle), and 210° vertical angle from the zenith at the center, is a type of VR image. Further, for example, an image captured by a camera, which can capture an image of a subject in a visual field (angle-of-view) that is 180° in the lateral direction (horizontal angle, azimuth angle) and a 180° vertical angle from the horizontal direction as the center, is a type of VR image. In other words, an image which has an image range of a visual field that is at least 160° (±80°) in the longitudinal direction and the lateral direction respectively, and which has an image range wider than the range that a person can visually recognize at the same time, is a type of VR image. When this VR image is VR-displayed (displayed in the display mode "VR view") and the orientation of the display device is changed in the lateral rotation direction, an omnidirectional image that is seamless in the lateral direction (horizontal rotation direction) can be viewed. In the longitudinal direction (vertical rotation direction), a seamless omnidirectional image can be viewed in a ±105° range from directly above (zenith), but the range exceeding 105° from the zenith becomes a blank region in which there is no image. The VR image can be interpreted as "an image of which image range is at least a part of a virtual space (VR space)".

The VR display (VR view) refers to a display method to display an image in the visual field range in accordance with the orientation of the display device, and is a display method (display mode) in which the display range can be changed. In the case of viewing a VR image in a state of wearing a head mounted display (HMD), which is a display device, an image in the visual field range, in accordance with the direction of the face of the user, is displayed. For example, in a VR image, it is assumed that an image in a viewing angle (angle-of-view) centering at 0° in the lateral direction (specific azimuth, such as North), and 90° in the longitudinal direction (90° from zenith, that is horizontal) is displayed at a certain timing. If the orientation of the display device is front/back reversed in this state (e.g. display surface is changed from facing South to facing North), the display range in the same VR image is changed to an image in a viewing angle centering at 180° in the lateral direction (opposite azimuth, such as South), and 90° in the longitudinal direction (horizontal). In other words, if the user turns their face from North to South (that is, turns back) in a state of viewing wearing an HMD, the image displayed on the HMD also changes from the image of North to the image of South. Because of such a VR display, the user is provided with a sensation as if they were actually in the VR image (inside the VR space). A smartphone attached to the VR goggles (head mounted adaptor) can be regarded as a type of HMD. The display method of the VR image is not limited to the above mentioned method, and the display range may be moved (scrolled) in accordance with the user operation using the touch panel, the direction button, or the like, instead of changing the orientation. Further, in the case of the VR display (VR view mode) as well, the display range may be changeable by Touch-Move on the touch panel, or a dragging operation with such an operation member as the mouse, in addition to changing the display range by changing the orientation.

An image processing unit 24 performs predetermined processing, such as pixel interpolation, resize processing (e.g. demagnification), and color conversion processing, on data (data from the A/D convertor 23*a*, data from the A/D convertor 23*b*, or data from a memory control unit 15). The image processing unit 24 also performs predetermined arithmetic processing using the captured image data. Based on this arithmetic processing result acquired by the image processing unit 24, a system control unit 50 performs exposure control or distance measurement control. Thereby a through-the-lens (TTL) type auto focus (AF) processing, auto exposure (AE) processing, or pre-flash emission (EF) processing is performed. Furthermore, the image processing unit 24 performs predetermined arithmetic processing using the captured image data, and performs TTL type auto white balance (AWB) processing based on the acquired arithmetic processing result. The image processing unit 24 also performs basic image processing on two images (fisheye images) acquired from the A/D convertor 23*a* and the A/D convertor 23*b*, and performs image composition (image connecting processing) so as to generate a single VR image. In the image processing to connect the two images, the image processing unit 24, for each of the two images, calculates a deviation amount between a reference image and a comparative image for each area by pattern matching processing, and detects a connecting position. Then considering the detected connecting position and the lens characteristic of each optical system, the image processing unit 24 corrects the distortion of each of the two images based on geometric conversion, and converts each image into an image in an omnidirectional image format. By blending these two images in the omnidirectional image format, the image processing unit 24 finally generates one omnidirectional image (VR image). The generated omnidirectional image (VR image) is an image generated using equidistant cylindrical projection, for example, and the position of each pixel can be corresponded with coordinates on the surface of the sphere. In the case of VR display in live view or in the case of reproduction, the image processing unit 24 also performs image segmenting processing, magnifying processing, distortion correction processing and the like to VR-display the VR image, and also performs rendering to draw the image in a VRAM of a memory 32.

The data outputted from the A/D convertors 23*a* and 23*b* is written to the memory 32 via the image processing unit 24 and the memory control unit 15 (or via the memory control unit 15 alone). The memory 32 stores image data, which is acquired by the imaging units 22*a* and 22*b* and then converted into digital data by the A/D convertors 23*a* and 23*b*, and stores images to be outputted to an external display via the connection I/F 25. The memory 32 has a storage capacity that is sufficient for storing a predetermined number of still images, or a predetermined duration of moving images and sounds.

The memory 32 is also a memory used for image display (video memory). The data for image display, stored in the memory 32, may be outputted to an external display via the connection I/F 25. In this case, the VR images, which are captured by the imaging units 22*a* and 22*b* and generated by the image processing unit 24, and which are stored in the memory 32, are transferred sequentially to the external display. By displaying the VR image, the external display functions as an electronic view finder, and can perform live view display (LV display) to display live view images. Furthermore, the VR images stored in the memory 32 can also be transferred to an external device (e.g. smartphone) connected wirelessly via a communication unit 54, and be displayed on the external device side, whereby live view display (remote LV display) can be performed.

Anon-volatile memory 56 is an electrically erasable/recordable recording medium. For the non-volatile memory 56, EEPROM, for example, is used. In the non-volatile memory 56, constants, programs, and the like, for operating the system control unit 50, are stored. Here "programs" refers to the computer programs for executing processing of various flow charts to be described later in the present embodiment.

The system control unit 50 is a control unit constituted of at least one processor or one circuit. The system control unit 50 controls the digital camera 100 in general. The system control unit 50 implements each processing of the present embodiment, which will be described later, by executing the above-mentioned programs recorded in the non-volatile memory 56. For the system memory 52, a RAM, for example, is used. In the system memory 52, constants and variables for operating the system control unit 50, programs read from the non-volatile memory 56, and the like are developed. The system control unit 50 also performs display control by controlling the memory 32, the image processing unit 24, and the memory control unit 15.

A system timer 53 is a timer unit that measures the time used for various controls, and measures the time for an internal clock.

The mode selection switch 60, the shutter button 61, and the operation unit 70 are operation means for inputting various operation instructions to the system control unit 50. The mode selection switch 60 switches the operation mode of the system control unit 50 to one of: a still image recording mode, a moving image capturing mode, a reproduction mode, a communication connecting mode, and the like. The still image recording mode includes: an auto image capturing mode, an auto scene determining mode, a manual mode, an aperture priority mode (Av mode), a shutter speed priority mode (Tv mode), and a program AE mode. The still image recording mode also includes various scene modes, in which the setting for image capturing is determined for each image capturing scene, and a custom mode. The user can directly switch to one of the above-mentioned modes using the mode selection switch 60. The user may also select an image capturing mode list screen first using the mode selection switch 60, then select one of a plurality of modes displayed on the display unit 28 using another operation member. In the same manner, the moving image capturing mode may include a plurality of modes.

A first shutter switch 62 turns ON in mid-operation of the shutter button 61, which is disposed on the digital camera 100, that is, in the half-depressed state (image capturing preparation instruction), and generates a first shutter switch signal SW1.

Responding to the generation of the first shutter switch signal SW1, an image capturing preparation operation, such as auto focus (AF) processing, auto exposure (AE) processing, auto white balance (AWB) processing, and pre-flash emission (EF) processing, is started.

A second shutter switch 64 turns ON when operation of the shutter button 61 is completed, that is, in the fully depressed state (image capturing instruction), and generates a second shutter switch signal SW2. Responding to the generation of the second shutter switch signal SW2, the system control unit 50 starts a series of operations of image capturing processing (processing from reading signals from the imaging units 22*a* and 22*b* to writing image data to the recording medium 90). The shutter button 61 is not limited to the operation member which can perform the two-step operation of full depression and half depression, but may be an operation member which can perform only a one-step depression operation. In this case, the image capturing preparing operation and the image capturing processing are continuously performed responding to the one-step depression operation. This is the same operation as the case of fully depressing the shutter button which can perform both half depression and full depression (a case where SW1 and SW2 are generated almost simultaneously).

An appropriate function is assigned to each operation member of the operation unit 70 for each scene by selecting from various function icons and choices displayed on the display unit 28, whereby each operation member functions as various function buttons.

The function buttons are, for example, an end button, a return button, an image switching button, a jump button, a filter button and an attribute change button. For example, when the menu button is pressed, a menus screen, on which various settings can be performed, is displayed on the display unit 28. The user can operate the operation unit 70 while checking the menu screen displayed on the display unit 28, whereby various settings can be performed intuitively.

A power supply control unit 80 is constituted of a battery detection circuit, a DC-DC convertor, a switch circuit (circuit to switch a block to be energized), and the like. The power supply control unit 80 detects whether or not a battery is installed, a type of battery, and residual amount of battery charge. The power supply control unit 80 also controls the DC-DC convertor based on this detection result and the instruction from the system control unit 50, and supplies the required voltage to each component (including a recording medium 90) for a required period. A power supply unit 30 is constituted of a primary battery (e.g. alkali battery, lithium battery), a secondary battery (e.g. NiCd battery, NiMH battery, Li battery), an AC adaptor, and the like.

A recording medium I/F 18 is an interface to connect a recording medium 90. The recording medium 90 is a recording medium to record captured images, such as a memory card. The recording medium 90 is constituted of a semiconductor memory, an optical disk, a magnetic disk, or the like. The recording medium 90 may be a recording medium that is detachable from the digital camera 100, or may be a recording medium embedded in the digital camera 100.

The communication unit 54 performs transmission/reception of video signals and audio signals using wireless connection or communication via cable. The communication unit 54 is also connectable to a wireless local area network (LAN) or Internet. The communication unit 54 can send images (including live view images) captured by the imaging unit 22*a* or the imaging unit 22*b*, and images recorded in the recording medium 90. The communication unit 54 can also receive images and various other information from an external device.

An orientation detection unit 55 detects an orientation of the digital camera 100 with respect to the gravity direction. Based on the orientation detected by the orientation detection unit 55, it can be determined whether the image captured by the imaging units 22*a* and 22*b* is an image captured by the digital camera 100 held horizontally or an image captured by the digital camera 100 held vertically. It can also determine the inclination of the digital camera 100 in three axis directions of yaw, pitch and roll when the image was captured. The system control unit 50 can attach the orientation information, in accordance with the orientation detected by the orientation detection unit 55, to an image file of the VR images captured by the imaging units 22*a* and 22*b*. The system control unit 50 can rotate the image (adjusts the orientation of the image so as to correct inclination) in accordance with the orientation detected by the orientation detection unit 55, and record the rotated image. For the orientation detection unit 55, one or a combination of an acceleration sensor, a gyro sensor, a geo-magnetic sensor, an azimuth sensor, an altitude sensor and the like can be used. By using the acceleration sensor, the gyro sensor or the azimuth sensor, the orientation detection unit 55 can also detect a movement of the digital camera 100 (e.g. pan, tilt, lift, remain still).

A microphone 20 is a microphone to collect the surrounding sounds of the digital camera 100. The collected sounds are recorded as sounds of a VR moving image, for example.

The connection I/F 25 is connected with an external device, and performs transmission/reception of images. The connection I/F 25 is a connection plug to connect an HDMI® cable, a USB cable or the like.

Figure 2A:
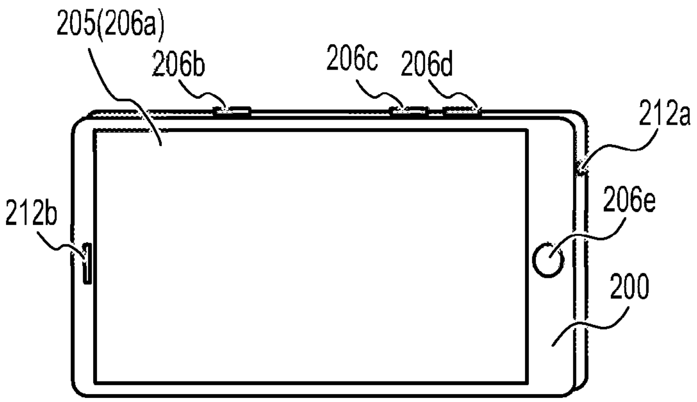
FIGS. 2A to 2D are diagrams for describing a display control device.

FIG. 2A is an example of an external view of a display control device 200, which is a type of electronic apparatus. A display 205 is a display unit to display images and various information. The display 205 is integrated with a touch panel 206*a*, as mentioned later, and can detect a touch operation to the display surface of the display 205. The display control device 200 can VR-display a VR image (VR contents) on the display 205. An operation unit 206 includes the touch panel 206*a* and the operation units 206*b*, 206*c*, 206*d* and 206*e*. The operation unit 206*b* is a power supply button that receives the operation to switch the power supply of the display control device 200 ON/OFF. The operation unit 206*c* and the operation unit 206*d* are volume button to increase/decrease the volume of the sound outputted from a sound output unit 212. The operation unit 206*e* is a home button to display a home screen on the display 205. A sound output terminal 212*a* is an earphone jack, and is a terminal to output the sounds to an earphone, an external speaker or the like. A speaker 212*b* is a speaker embedded in the main unit, and outputs sounds.

Figure 2B:
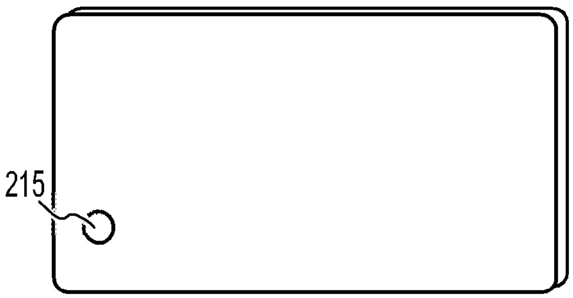

FIG. 2B is an example of an external view of the display control device 200 viewing the other surface. An imaging unit 215 is a camera that can capture an image.

Figure 2C:
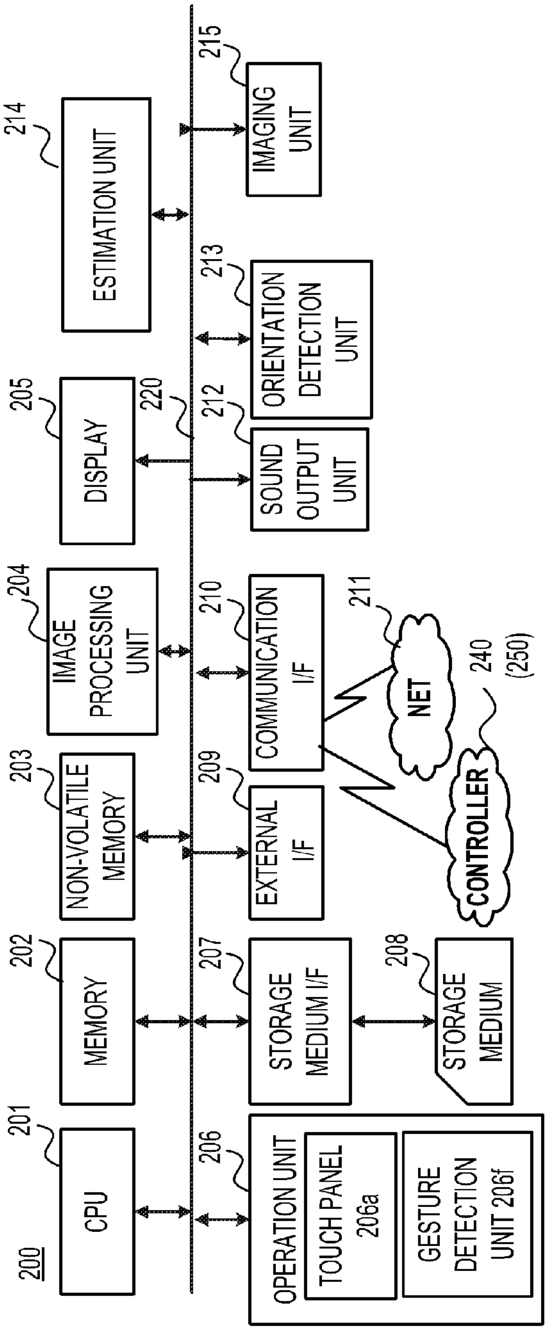

FIG. 2C is a diagram depicting an example of a configuration of the display control device 200. The display control device 200 can be configured using such a display device as a smartphone. A CPU 201, a memory 202, a non-volatile memory 203, an image processing unit 204, the display 205, the operation unit 206, a storage medium I/F 207, an external I/F 209 and a communication I/F 210 are connected to an internal bus 220. A sound output unit 212 and an orientation detection unit 213 are also connected to the internal bus 220. Each component connected to the internal bus 220 can exchange data with each other via the internal bus 220.

The CPU 201 is a control unit that controls the display control device 200 in general. The CPU 201 is constituted of at least one processor or one circuit. The memory 202 is constituted of a RAM (e.g. volatile memory using a semiconductor element), for example. According to a program stored in the non-volatile memory 203, for example, the CPU 201 controls each component of the display control device 200 using the memory 202 as a work memory. In the non-volatile memory 203, image data, sound data, other data, various programs for the CPU 201 to operate, and the like are stored. The non-volatile memory 203 is constituted of a flash memory, a ROM, or the like, for example.

Based on the control by the CPU 201, the image processing unit 204 performs various image processing on images stored in the non-volatile memory 203 and the storage medium 208, video signals acquired via the external I/F 209, images acquired via the communication I/F 210, and the like. The image processing performed by the image processing unit 204 includes: A/D conversion processing, D/A conversion processing, image data encoding processing, compression processing, decoding processing, magnifying/demagnifying processing (resize), noise reduction processing, color conversion processing, and the like. Further, the image processing unit 204 also performs various image processing (e.g. panoramic development, mapping processing, conversion) of a VR image, which is a wide range image (omnidirectional image, or an image which is not omnidirectional, but has a wide range of data). The image processing unit 204 may be configured with a dedicated circuit block to perform a specific image processing. Depending on the type of image processing, the CPU 201 may perform the image processing in accordance with the program without using the image processing unit 204.

The display 205 displays an image, a graphical user interface (GUI) screen that constitutes a GUI, and the like, based on the control of the CPU 201. The CPU 201 generates a display control signal in accordance with a program. The CPU 201 controls each component of the display control device 200 so that "video signals to be displayed on the display 205 are generated and outputted to the display 205" using the display control signal. The display 205 displays the image based on the outputted video signals. The configuration of the display control device 200 itself may include only the components up to the interface to output the video signals to be displayed on the display 205. The display 205 may be configured as an external monitor (e.g. TV).

The operation unit 206 is an input device to receive user operation. The operation unit 206 includes: a text information input device (e.g., keyboard), a pointing device (e.g., mouse, touch panel), buttons, a dial, a joystick, a touch sensor, a touchpad, and the like. The touch panel is a two-dimensional input device superimposed on the display 205, so that coordinate information corresponding to the contacted position is outputted.

A storage medium 208 (e.g. memory card, CD or DVD) is attachable to the storage medium I/F 207. Based on the control of the CPU 201, the storage medium I/F 207 reads data from the attached storage medium 208, or writes data to the storage medium 208. The external I/F 209 is an interface to connect an external device wirelessly or via cable, so as to input/output video signals and audio signals. The communication I/F 210 is an interface to communicate with an external device, Internet 211, or the like, so as to perform transmission/reception of various data, such as files and commands.

The sound output unit 212 outputs the sounds (sounds of a moving image and music data), operation tones, ring tones, various notification tones, and the like. The sound output unit 212 includes the sound output terminal 212*a* to connect an earphone or the like, and the speaker 212*b*. The sound output unit 212 may output sounds via wireless communication or the like.

The orientation detection unit 213 detects the orientation of the display control device 200 with respect to the gravity direction, and the inclination of the orientation with respect to each axis in the yaw, roll and pitch directions. Based on the orientation detected by the orientation detection unit 213, it can be determined whether the display control device 200 is held horizontally, or held vertically, or turned upward, turned downward, or in a diagonal orientation. For the orientation detection unit 213, at least one of an acceleration sensor, a gyro sensor, a geo-magnetic sensor, an azimuth sensor, an altitude sensor, or the like can be used.

An estimation unit 214 estimates a self-position and peripheral environment of the display control device 200, or in a space of the later mentioned VR goggles 230.

"Self-position" refers to a position of the display control device 200 or the VR goggles 230 in a real space. The "self-position" is expressed, for example, by three parameters of which the origin is a predetermined position in a space in a predetermined range (parameters indicating positions in the coordinate system, of which X axis, Y axis and Z axis are three axes orthogonal to each other). The "self-position" may be further expressed by three parameters that indicate orientation (attitude).

An "obstacle region" is a region where an obstacle is present in a range where a user holding the display control device 200 or a user wearing the VR goggles 230 exists. The "obstacle region" is expressed by a plurality of sets of three parameters of which origin is a predetermined position in a space in a predetermined range (parameters indicating positions in the coordinate system, of which X axis, Y axis and Z axis are three axes orthogonal to each other).

An imaging unit 215 is a camera that can acquire an image. The acquired image can be used for various detection processing by a gesture detection unit 206*f*, the estimation unit 214, and the like. The imaging unit 215 can also output an image of the external world to the display 205.

The operation unit 206 includes the touch panel 206*a*. The CPU 201 can detect the following operations or states on the touch panel 206*a*.

- a finger or a pen which does not touch the touch panel 206*a* initially touches the touch panel 206*a*, that is, the start of touch (hereafter Touch-Down)
- a finger or a pen is touching the touch panel 206*a* (hereafter Touch-On)
- a finger or a pen is moving on the touch panel 206*a* in the touched state (hereafter Touch-Move)
- a finger or a pen touching the touch panel 206*a* is released from the touch panel 206*a*, that is, the end of touch (hereafter Touch-Up)
- Nothing is touching the touch panel 206*a* (hereafter Touch-Off)

When Touch-Down is detected, Touch-On is detected simultaneously. Unless Touch-Up is detected after Touch-Down, normally Touch-On is continuously detected. When Touch-Move is detected as well, Touch-On is detected simultaneously. Even if Touch-On is detected, Touch-Move is not detected unless the touch position is moving. When Touch-Up of the finger or the pen is detected, Touch-Off is detected.

These operations/states and coordinates of the positions on the touch panel 206*a* where a finger or a pen is touching are notified to the CPU 201 via the internal bus, and based on the notified information, the CPU 201 determines which operation (touch operation) was performed on the touch panel 206*a*. For Touch-Move, the moving direction of the finger or the pen moving on the touch panel 206*a* can also be determined for the vertical component and the horizontal component on the touch panel 206*a* respectively, based on the change of the positional coordinates. In the case where Touch-Move for a predetermined distance or more is detected, the CPU 201 determines that the slide operation was performed. An operation of quickly moving a fingertip touching the touch panel 206*a* and releasing the fingertip from the touch panel 206*a* is called a "flick". In other words, flick is an operation of quickly moving (flicking) the finger on the touch panel 206*a*. In a case where Touch-Move, for at least a predetermined distance at a predetermined speed or faster, is detected, and Touch-Up is detected thereafter, it is determined that flick was performed (it is determined that flick occurred immediately after the slide operation). Furthermore, a touch operation of touching a plurality of locations (e.g. two points) simultaneously and moving these touch positions close to each other is called a "Pinch-In", and the touch operation of moving these touch positions away from each other is called a "Pinch-Out". Pinch-In and Pinch-Out are collectively called a "pinch operation" (or simply a "pinch"). The type of the touch panel 206*a* may be any of various types, such as a resistive film type, an electrostatic capacitive type, a surface acoustic wave type, an infrared type, an electro-magnetic induction type, an image recognition type, and a photosensor type. Some types detect touch when the touch panel is actually contacted, while other types detect touch when a finger or a pen approaches the touch panel, but either type can be used.

The operation unit 206 includes a gesture detection unit 206*f*. The gesture detection unit 206*f* acquires an image capturing a hand of the user and the like from the imaging unit 215, and detects gesture from the image.

Figure 2D:
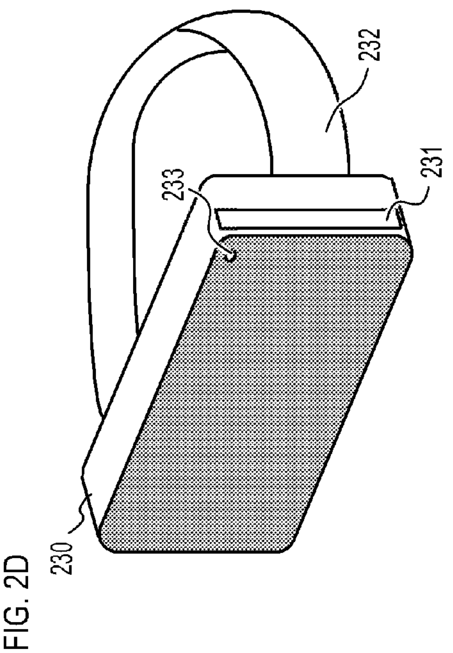

FIG. 2D is an external view of VR goggles (head mount adaptor) 230 to which the display control device 200 can be attached. The display control device 200 attached to the VR goggles 230 can be used as the head mounted display. An insertion port 231 is an insertion port to insert the display control device 200. The entire display control device 200 can be inserted into the VR goggles 230 in a state of turning the display surface of the display 205 to the side of a head band 232 (that is, the user side) used for securing the VR goggles 230 to the head of the user. By the user wearing the VR goggles 230 to which the display control device 200 is attached, the user can view the display 205 of the display control device 200, without holding the display control device 200 by their hand. In this case, when the user moves their head or entire body, the orientation of the display control device 200 also changes. The orientation detection unit 213 detects the change of the orientation of the display control device 200, and the CPU 201 performs the VR display processing based on this change of orientation. Here the orientation detection unit 213 detecting the orientation of the display control device 200 is equivalent to detecting the orientation of the head of the user (direction to which the line-of-sight of the user is turning).

Figure 3A:
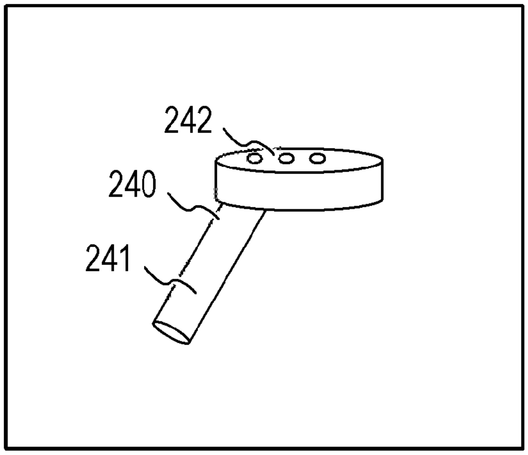
FIGS. 3A and 3B are diagrams for describing a controller.
Figure 3B:
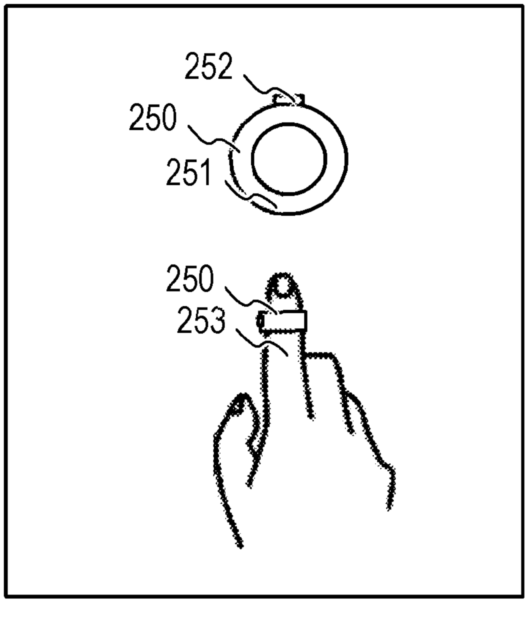

FIGS. 3A and 3B are external views of controllers (controller 240 and controller 250) which can communicate with the display control device 200. In the case of the controller 240, which is a grip type, as illustrated in FIG. 3A, the user grips a holding unit 241 and operates members on an operation surface 242. Thereby an operation event is notified from the controller 240 to the display control device 200.

On the other hand, the controller 250, which is a ring type, as illustrated in FIG. 3B, includes a ring unit 251 to wear the controller 250 on a finger 253 of the user, and a ring operation unit 252. The ring operation unit 252 may be a push button type member, or a member that can detect contact of the finger (e.g. rotation type dial, optical track pad).

Figure 4:
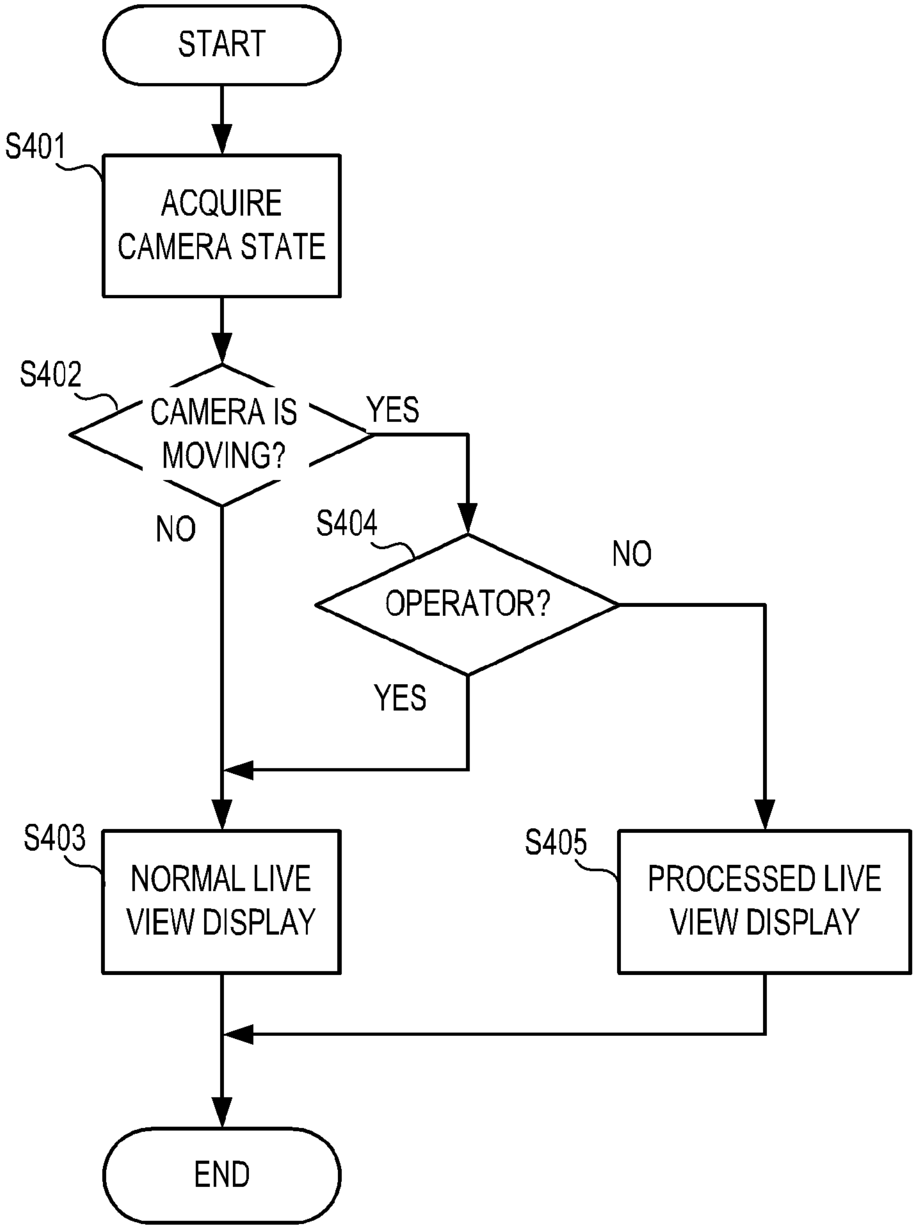
FIG. 4 is a flow chart for describing an example of processing to control display of a VR video.

With reference to the flow chart in FIG. 4, the processing to control live view display of a VR video, which is displayed on the display control device 200, depending on whether or not the user wearing the display control device 200 is the operator of the digital camera 100, will be described. The processing in the flow chart in FIG. 4 is implemented by the CPU 201 developing a program, which is recorded in the non-volatile memory 203, in the memory 202, and executing the program.

In step S401, the CPU 201 acquires information on a camera state of the digital camera 100 via the communication I/F 210. The camera state includes movement information (information on pan, tilt, dolly or zoom of the digital camera 100), which is acquired by the orientation detection unit 55, the operation unit 70, or the like. The camera state may include information on vibration-proof setting of the digital camera 100, subject detection setting, and various other setting states (control states). The CPU 201 also acquires a VR video of a subject, which is captured by the digital camera 100, from the digital camera 100.

In step S402, the CPU 201 determines whether or not the digital camera 100 is moving. Processing advances to step S404 if it is determined that the digital camera 100 is moving (if movement of the digital camera 100 is detected). Processing advances to step S403 if it is determined that the digital camera 100 is not moving. For example, the CPU 201 determines that the digital camera 100 is moving when the movement information (moving distance or moving speed) of the digital camera 100 exceeds a threshold.

In step S403, the CPU 201 performs a normal live view display (displays a live view image of VR video on the display control device 200 without performing processing to reduce the probability of generation of VR sickness). Here the live view image is an image of a part of one frame of the VR video. The VR sickness is a symptom generated in the user by the user viewing the VR video (symptom similar to motion sickness). In the following, the processing to reduce the "probability of the generation of VR sickness in the user viewing the VR video" is called "VR sickness reducing processing".

In step S403, the CPU 201 may display a live view image after performing the VR sickness reducing processing, instead of the normal live view display. In this case, the CPU 201 decreases the degree (intensity) of the VR sickness reducing processing in step S403, compared with the degree of the VR sickness reducing processing in step S405. As the degree of the VR sickness reducing processing increases, the probability of generation of VR sickness in the user wearing the display control device 200 decreases more in the processing performed on the live view image. In the case where the degree of the VR sickness reducing processing is the minimum, the VR sickness reducing processing is not performed on the live view image.

In step S404, the CPU 201 determines whether or not the user wearing the display control device 200 (hereafter called "wearer") is the operator of the digital camera 100. Processing advances to step S403 if it is determined that the wearer is the operator. Processing advances to step S405 if it is determined that the wearer is not the operator.

In step S404, the CPU 201 may acquire the information on whether or not the wearer is the operator of the digital camera 100, from the digital camera 100 via the external I/F 209 or the communication I/F 210. Further, the wearer may be allowed to set in advance that the digital camera 100 is the display device of this wearer, using the operation unit 206 of the display control device 200, the controller 240, the controller 250, or the like. The CPU 201 may determine whether or not the wearer is the operator based on this information that is set. All that is required here is that the CPU 201 can acquire information to determine whether or not the operator of the digital camera 100 is using the display control device 200. The operation on the digital camera 100 may be operation on the operation unit 70, or may be remote operation via the connection I/F 25 or the like.

In step S405, the CPU 201 performs a processed live view display (displays live view image of the VR video after performing the VR sickness reducing processing on the display control device 200).

FIGS. 6A to 6D indicate examples of the live view images displayed on the display control device 200 according to the present embodiment.

Figure 6A:
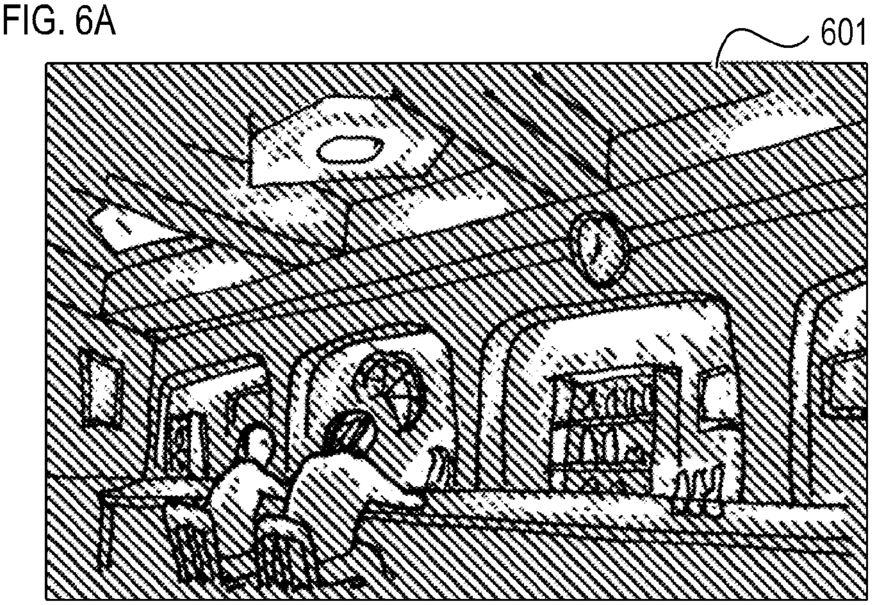
FIGS. 6A to 6D are illustrations for describing processing to reduce VR sickness.

FIG. 6A is an illustration for describing a normal live view display. A live view display 601 is an image displayed on the display control device 200, and is a live view image without performing the VR sickness reducing processing.

Figure 6B:
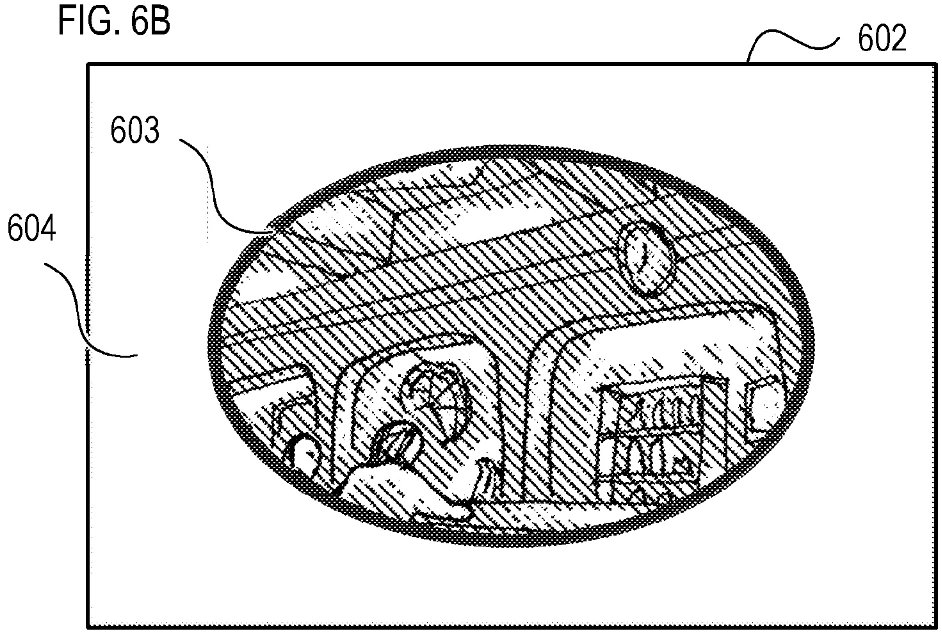

FIG. 6B is an illustration for describing a processed live view display. An image 602 is an image displayed on the display control device 200. The image 602 includes a live view image 603 and an image 604. The live view image 603 is an image after performing processing to decrease the display range of the live view image 601 (decreasing the angle-of-view), which is an example of the VR sickness reducing processing. The image 604 is a white monotone image, of which a part (a peripheral region) of the live view image 601 is replaced to decrease the display range of the live view image 601.

When the VR sickness reducing processing is performed on the live view image 601, the display ratio between the live view image 603 and the white monotone image 604 may be changeable. Thereby the degree of the VR sickness reducing processing may be set to be changeable.

The VR sickness reducing method is not limited to this method. For the VR sickness reducing processing, a processing to continue displaying a still image of the live view at the timing immediately before the movement of the digital camera 100 (to stop reproduction of the VR video), processing to display a live view image with decreasing the frame rate, or the like, may be performed. Here instead of the timing immediately before the movement of the digital camera 100, the timing at which the movement of the digital camera 100 was detected, or a current timing, for example, may be used. Further, for the VR sickness reducing processing, processing to display a single color image (color other than white, such as black) instead of displaying the live view image, processing to display a predetermined standby image (image stored in the storage medium 208) instead of displaying the live view image, or the like, may be performed. Furthermore, in the processing to decrease the viewing angle, the range in which the live view image remains is not limited to the center portion of the angle-of-view, but may be an arbitrary range. In other words, for the VR sickness reducing processing, any processing may be performed as long as the image processing can reduce the probability of generating the VR sickness.

Figure 6C:
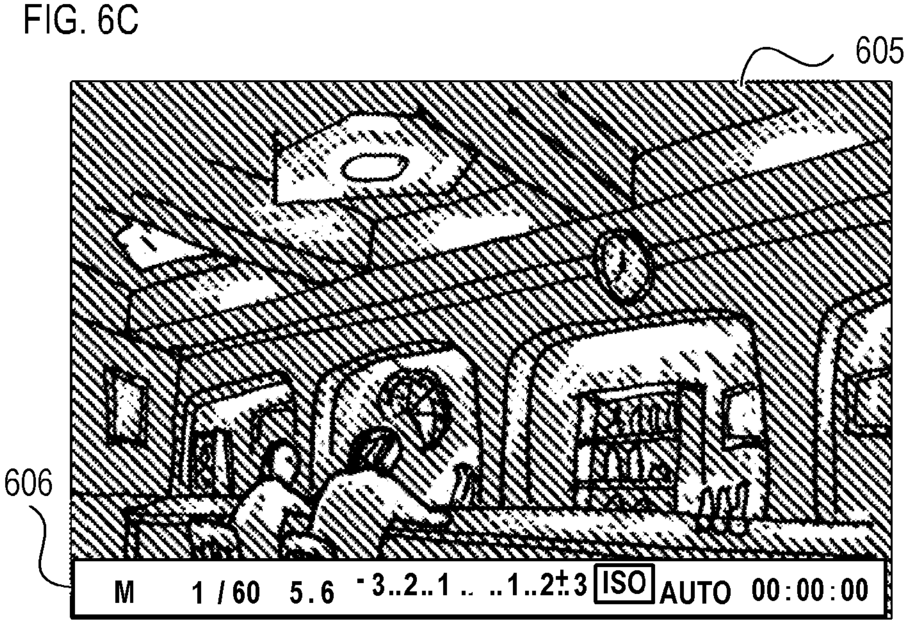

FIG. 6C is an example when a live view image, on which a camera setting state of the digital camera 100 is superimposed, is displayed on the display control device 200. An image 605 is an image displayed on the display control device 200. The camera setting state 606 is a camera setting state acquired from the digital camera 100.

Figure 6D:
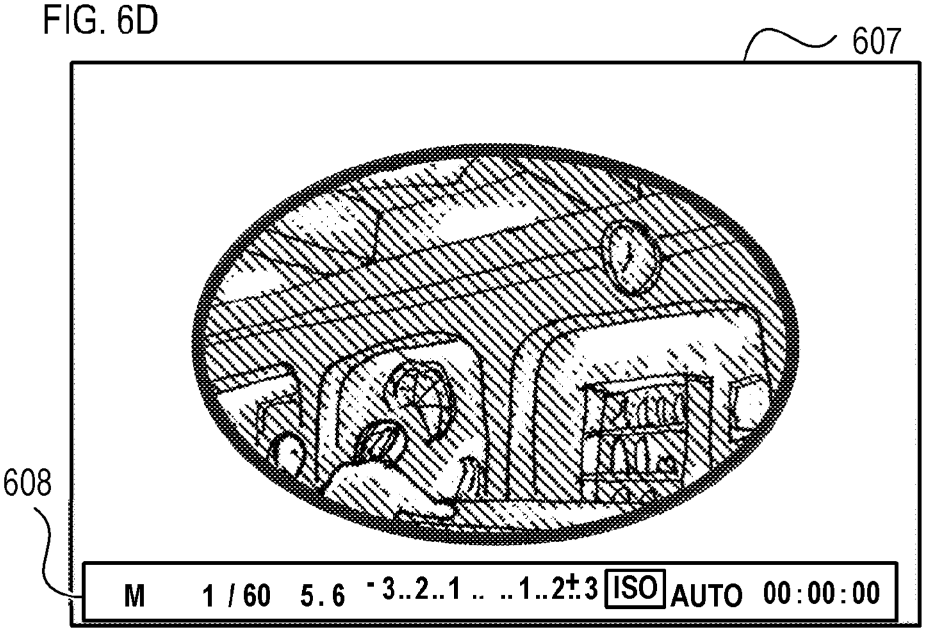

FIG. 6D indicates an image after the VR sickness reducing processing is performed on the live view image illustrated in FIG. 6C. An image 607 is an image displayed on the display control device 200. A camera setting state 608, out of an image 607, is a camera setting state acquired from the digital camera 100. Even in the case where the VR sickness reducing processing is performed on the live view image, the VR sickness reducing processing may not be performed on the image of the camera setting state 608. In other words, the camera setting state 608 may be displayed in the same manner as the camera setting state 606 in the normal live view display illustrated in FIG. 6C.

Instead of the camera setting state 608, various setting states of the display control device 200 may be displayed. Further, the camera setting state 608 and various setting states of the display control device 200 may be displayed at the same time. The position, where the camera setting state 608 and various setting states of the display control device 200 are displayed, is not limited to the lower portion of the screen, but may be an arbitrary position.

Example 1: Display Control Processing for VR Video

An example of processing to control the display of a VR video displayed on the display control device 200 (another example of the processing in the flow chart in FIG. 4) will be described next with reference to the flow chart in FIG. 5A. This processing is implemented by the CPU 201 developing a program (recorded in the non-volatile memory 203) in the memory 202, and executing the program.

In step S501, the CPU 201 acquires information on a camera state of the digital camera 100 via the communication I/F 210. The CPU 201 also acquires VR video of a subject, which is captured by the digital camera 100, from the digital camera 100.

In step S502, the CPU 201 determines whether or not the digital camera 100 is moving (digital camera 100 is changing the position thereof). Processing advances to step S504 if it is determined that the digital camera 100 is moving (if movement of the digital camera 100 is detected). Processing advances to step S503 if it is determined that the digital camera 100 is not moving. For example, the CPU 201 determines that the digital camera 100 is moving when the movement information (moving distance or moving speed) of the digital camera 100 exceeds a threshold Th1.

In step S503, the CPU 201 performs a normal live view display. In step S503, the CPU 201 may display a live view image after performing the VR sickness reducing processing, instead of the normal live view display. In this case, the CPU 201 decreases the degree (intensity) of the VR sickness reducing processing in step S503, compared with the degree of the VR sickness reducing processing in step S510.

In step S504, the CPU 201 determines whether or not the wearer is the operator of the digital camera 100. Processing advances to step S505 if it is determined that the wearer is the operator. Processing advances to step S510 if it is determined that the wearer is not the operator.

In step S505, the CPU 201 determines whether or not the display control device 200 is set to a mode (reducing processing mode) to perform the VR sickness reducing processing (processing to reduce the probability of generation of VR sickness). Processing advances to step S506 if it is determined that the reducing processing mode is set. Processing advances to step S503 if it is determined that the reduction processing mode is not set. The wearer can control, via the operation unit 206, whether or not the display control device 200 is set to the reducing processing mode.

In step S506, the CPU 201 determines whether or not the display control device 200 is set to a mode (angle-of-view maintaining mode) to maintain the angle-of-view. Processing advances to step S512 if it is determined that the angle-of-view maintaining mode is set. Processing advances to step S507 if it is determined that the angle-of-view maintaining mode is not set. The wearer can control, via the operation unit 206, whether or not the display control device 200 is set to the angle-of-view maintaining mode.

In step S507, the CPU 201 determines whether or not the digital camera 100 is in the recording state (during recording video). Processing advances to step S508 if it is determined that the digital camera 100 is not in the recording state. Processing advances to step S503 if it is determined that the digital camera 100 is in the recording state. Instead of determining whether or not the digital camera 100 is in the recording state, it may be determined whether or not the digital camera 100 is in the pre-recording state (state of recording from a specified timing before the actual start of recording). Further, instead of recording whether or not the digital camera 100 is in the recording state, it may be determined whether or not the digital camera 100 is in the live streaming state (state of transmitting the video in real-time via Internet).

In step S508, the CPU 201 determines whether or not a live view image of the VR video, in which camera shake is corrected by the digital camera 100, is being acquired (whether or not the vibration proof setting of the digital camera 100 is ON, or whether or not image capturing using a gimbal camera or the like is progressing). The gimbal camera is a camera which includes a gimbal, which is a camera shake prevention item. Processing advances to step S503 if it is determined that a live view image of the VR video, in which camera shake is corrected, is being acquired. Processing advances to step S509 if it is determined that a live view image of the VR video, in which camera shake is corrected, is not being acquired.

In step S509, the CPU 201 determines whether or not the subject detected by the digital camera 100 is being auto-focused. Processing advances to step S511 if it is determined that the detected subject is being auto-focused. Processing advances to step S510 if it is determined that the detected subject is not being auto-focused. In the determination in step S509, it may be determined not "whether or not the detected subject is being auto-focused", but "whether or not a subject is detected by the digital camera 100".

In step S510, the CPU 201 displays processed live view display.

In step S511, the CPU 201 generates a live view image of which center position is the position of the detected subject, performs the VR sickness reducing processing on the generated live view image, and displays this processed live view image on the display control device 200.

In step S512, the CPU 201 determines whether or not "the moving distance of the digital camera 100 is a moving distance with which the current angle-of-view, corresponding to the live view image displayed on the display 205 of the display control device 200, can be maintained". Processing advances to step S513 if it is determined that the moving distance of the digital camera 100 is the moving distance with which the current angle-of-view can be maintained. Processing advances to step S507 if it is determined that the moving distance of the digital camera 100 is not the moving distance with which the current angle-of-view can be maintained.

"The moving distance of the digital camera 100 is a moving distance with which the current angle-of-view can be maintained" means, for example, that the current live view image and the live view image to be displayed next can be controlled to be images having the same angle-of-view (can be displayed at the same angle-of-view). If the angle-of-view of the current live view image is included in the angle-of-view of the next frame of the VR video, it can be said that "the moving distance of the digital camera 100 is the moving distance with which the current angle-of-view can be maintained".

In step S513, the CPU 201 determines whether or not the movement information (moving distance or moving speed) of the digital camera 100 exceeds a threshold Th2. Processing advances to step S507 if it is determined that the movement information (moving distance or moving speed) of the digital camera 100 exceeds the threshold Th2. Processing advances to step S514 if it is determined that the movement information of the digital camera 100 does not exceed the threshold Th2. Here the threshold Th2 has a value larger than the threshold Th1 used in step S502, for example.

In step S514, the CPU 201 displays a live view image of which angle-of-view is the same as the angle-of-view of the previous live view image, on the display control device 200 (performs live view display with maintaining the angle-of-view). In step S514, the live view image is not influenced by the movement of the digital camera 100, since the angle-of-view is maintained. This means that the probability of generating VR sickness on the wearer viewing the live view image is low, hence the CPU 201 does not perform the VR sickness reducing processing.

Figure 5A:
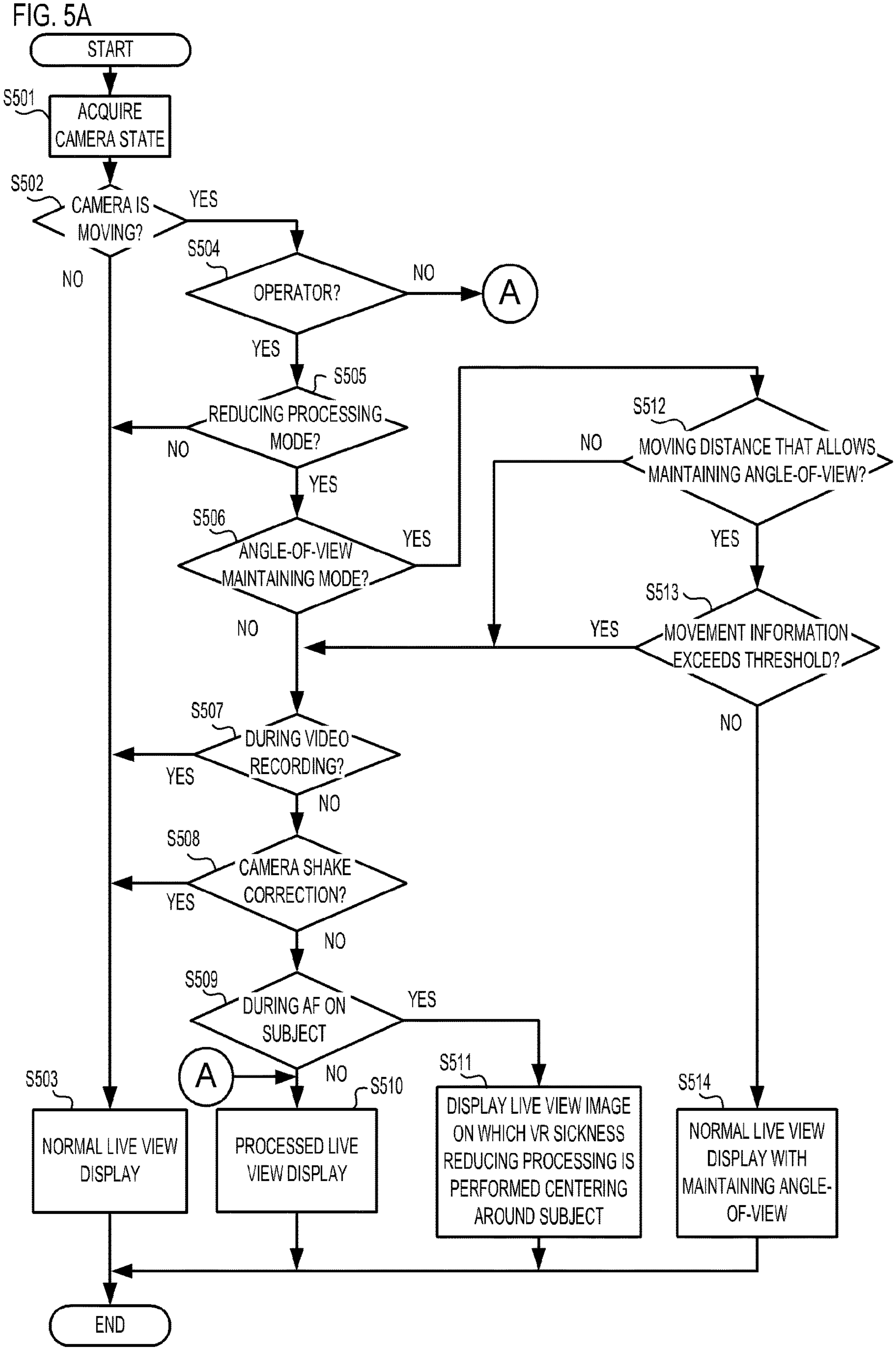
FIG. 5A is a flow chart for describing an example of processing to control display of a VR video.

According to the processing in the flow chart in FIG. 5A, in the case where the digital camera 100 is moving, the display of the VR video can be controlled in accordance with the setting of the display control device 200 if the wearer is the operator of the digital camera 100. If the wearer is not the operator in the case where the digital camera 100 is moving, on the other hand, the processed live view display is always performed.

Example 2: Display Control Processing for VR Video

Another example of processing to control the display of a VR video displayed on the display control device 200 (another example of the processing in the flow chart in FIG. 4) will be described next with reference to the flow chart in FIG. 5B. This processing is implemented by the CPU 201 developing a program (recorded in the non-volatile memory 203) in the memory 202, and executing the program.

Figure 5B:
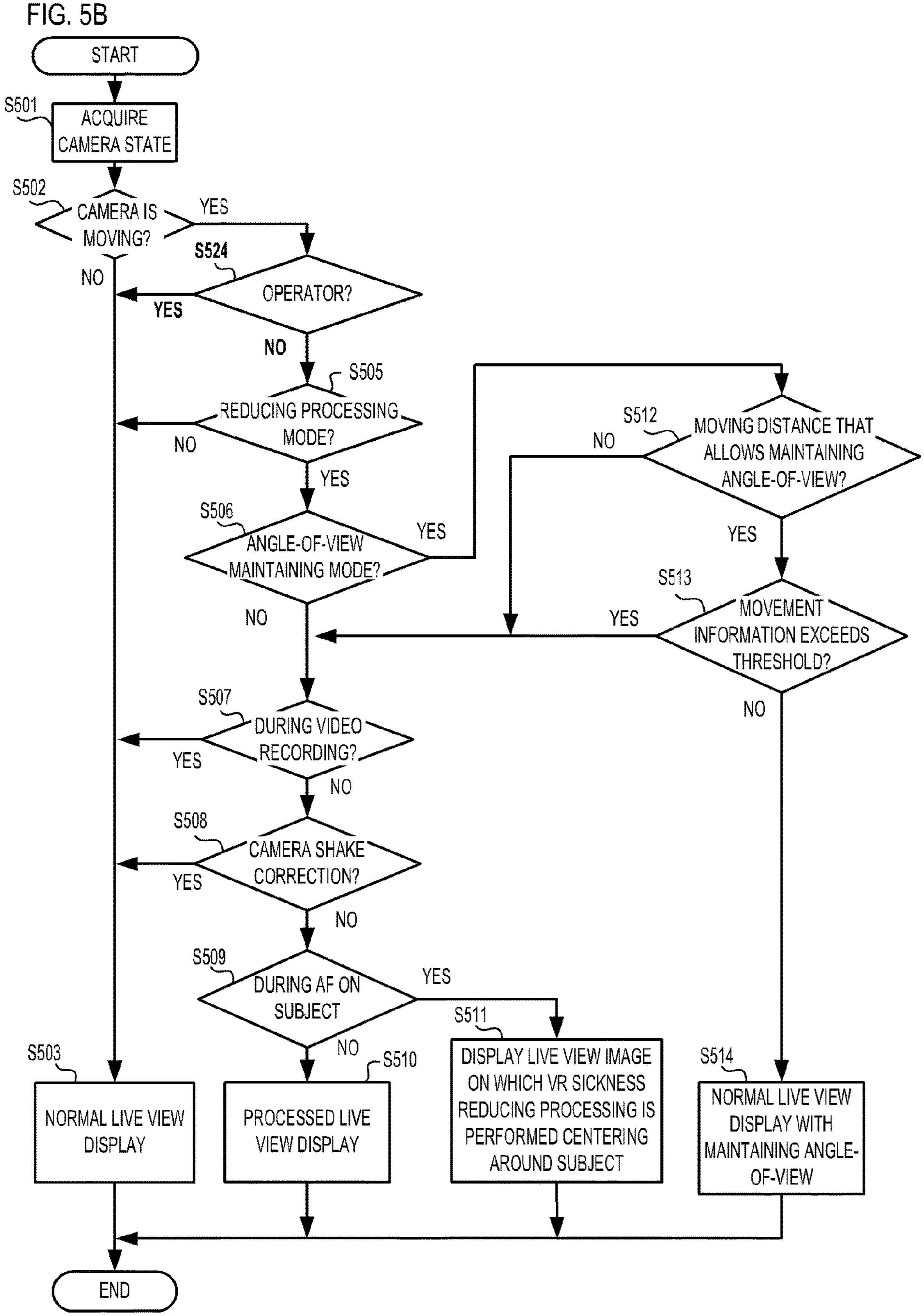
FIG. 5B is a flow chart for describing an example of processing to control display of a VR video.

In the processing in the flow chart in FIG. 5B, only processing in step S524 is different from step S504 of the processing in the flow chart in FIG. 5A. The other processing steps in FIG. 5B are the same as FIG. 5A, hence description thereof will be omitted. When it is determined that the digital camera 100 is moving in step S502, the processing in step S524 starts.

In step S524, the CPU 201 determines whether or not the wearer is the operator of the digital camera 100. Processing advances to step S503 if it is determined that the wearer is the operator. Processing advances to step S505 if it is determined that the wearer is not the operator.

According to the processing in the flow chart in FIG. 5B, in the case where the digital camera 100 is moving, the display of the VR video can be controlled in accordance with the setting of the display control device 200 if the wearer is not the operator of the digital camera 100. If the wearer is the operator in the case where the digital camera 100 is moving, on the other hand, the normal live view display is always performed.

If the degree of processing to reduce the probability of generation of VR sickness in the wearer is controlled depending on whether or not the wearer is the operator, processing in the flow chart arbitrarily combining the flow chart in FIG. 5A and the flow chart in FIG. 5B may be performed.

A number of operators of the digital camera 100 may be 2 or more, or may be 0. A number of non-operators of the digital camera 100 may be 2 or more, or may be 0. The subject to be detected may be a person, an animal, a car, an airplane, or the like. The subject may be detected responding to the instruction (selection) by the operator of the digital camera 100. The digital camera 100 may automatically detect the subject.

The display control device 200 and the VR goggles 230 may be integrated in one casing. The processing performed by the image processing unit 204 or the like of the display control device 200 (image processing of the VR video to be displayed) may be performed by the image processing unit of the digital camera 100. In this case, the processed video may be transmitted via the external I/F 209 and the communication I/F 210, and be displayed on the display 205 of the display control device 200.

According to the present invention, a VR video appropriate for each user who views the VR video can be displayed.

While the present invention has been described based on the preferred embodiments thereof, the present invention is not limited to these specific embodiments, but includes various modes within the scope not departing from the spirit of the invention. Part of each of the above embodiments may be combined when required.

In the above description, the phrase "processing advances to step S1 if A is B or more, and processing advances to step S2 if A is less (lower) than B" may be interpreted as "processing advances to step S1 if A is larger (higher) than B, and processing advances to step S2 if A is B or less". Furthermore, "processing advances to step S1 if A is larger (higher) than B, and processing advances to step S2 if A is B or less" may be interpreted as "processing advances to step S1 if A is B or more, and processing advances to step S2 if A is smaller (lower) than B". In other words, as long as no inconsistency is generated, "A or more" may be interpreted as "larger (higher; longer; more) than A", and "A or less" may be interpreted as "smaller (lower; shorter; less) than A". Further, "larger (higher; longer; more) than A" may be interpreted as "A or more", and "smaller (lower; shorter; less) than A" may be interpreted as "A or less".

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-043237, filed on Mar. 17, 2023, which is hereby incorporated by reference herein in its entirety.

What is claimed is:

1. A display control device for controlling a display, the display control device comprising:

a processor; and a memory storing a program which, when executed by the processor, causes the processor to:

(1) acquire a VR video captured by an imaging device;

(2) detect movement of the imaging device;

(3) perform, on a live view image of the VR video, reducing processing to reduce a probability of generating a specific symptom to a user viewing the live view image displayed on the display;

(4) determine whether the user is (a) an operator that operates the imaging device and captures the VR video or (b) a viewer of the VR video other than the operator;

(5) control a degree of the reducing processing on the live view image based on whether the user is the operator or the viewer, in a case where movement of the imaging device is detected; and (6) control the display to display an image obtained after the reducing processing is performed on the live view image, in a case where the reducing processing is performed on the live view image, wherein the reducing processing includes reducing an angle of view of the live view image by replacing a peripheral region of the live view image with a single color image, and wherein the degree of the reducing processing is determined based on a display ratio between (i) a remaining region of the live view image and (ii) the single color image.

2. The display control device according to claim 1, wherein in the case where the movement of the imaging device is detected, the program when executed by the processor causes the processor to set a degree of the reducing processing on the live view image to be higher in a case where the user is not an operator of the imaging device than in a case where the user is an operator of the imaging device.

3. The display control device according to claim 1, wherein in the case where the movement of the imaging device is detected, the program when executed by the processor causes the processor to control a degree of the reducing processing on the live view image in accordance with setting of the display control device in a case where the user is an operator of the imaging device.

4. The display control device according to claim 1, wherein in the case where the movement of the imaging device is detected, the program when executed by the processor causes the processor to control a degree of the reducing processing on the live view image in accordance with setting of the display control device in a case where the user is not an operator of the imaging device.

5. The display control device according to claim 1, wherein the program when executed by the processor causes the processor to perform, as the reducing processing on the live view image, processing of replacing at least a part of the live view image with a specific image.

6. The display control device according to claim 1, wherein as the reducing processing on the live view image, the program when executed by the processor causes the processor to perform processing of continuously displaying a still image of the live view image at a specific timing, or processing of reducing a frame rate of the live view image.

7. The display control device according to claim 1, wherein in a case where the movement of the imaging device is not detected, the program when executed by the processor causes the processor not to perform the reducing processing on the live view image.

8. The display control device according to claim 7, wherein in a case where a moving speed or a moving distance of the imaging device does not exceed a threshold, the program when executed by the processor causes the processor not to perform the reducing processing on the live view image.

9. The display control device according to claim 1, wherein the live view image is a part of images of the VR video, wherein in a case where a second image is displayable in a state where an angle-of-view corresponding to a first image is maintained, the program when executed by the processor causes the processor to control the display to display the second image maintaining the angle-of-view corresponding to the first image, wherein the first image is a current live view image, wherein the second image is a live view image next to the first image, and wherein in a case where the second image maintaining the angle-of-view corresponding to the first image is displayable, the program when executed by the processor causes the processor not to perform the reducing processing on the second image.

10. The display control device according to claim 1, wherein the program when executed by the processor causes the processor:

(1) to control the display to display specific setting information along with the live view image, and (2) not to perform the reducing processing on the specific setting information, even in the case of performing the reducing processing on the live view image.

11. The display control device according to claim 1, wherein the program when executed by the processor causes the processor not to perform the reducing processing on the live view image while the imaging device is recording, pre-recording, or live streaming an image.

12. The display control device according to claim 1, wherein the program when executed by the processor causes the processor not to perform the reducing processing on the live view image in a case where the VR video is a video on which camera shake correction has been performed.

13. The display control device according to claim 1, wherein in a case where the movement of the imaging device is detected and the imaging device is in a state of detecting a subject, the program when executed by the processor causes the processor to generate the live view image, a center position of which is a position of the detected subject, and perform the reducing processing on the generated live view image.

14. The display control device according to claim 1, wherein whether the user is the operator or the viewer is determined based on information acquired from the imaging device.

15. The display control device according to claim 1, wherein whether the user is the operator or the viewer is set by the user.

16. The display control device according to claim 1, wherein in a case where movement of the imaging device is not detected, the program causes the processor to perform the reducing processing on the live view image with a third degree, and wherein the third degree is lower than a degree of the reducing processing that is controlled in a case where movement of the imaging device is detected and the user is the viewer.

17. The display control device according to claim 1, wherein the remaining region includes a central region of the live view image.

18. A display control method of controlling a display, the display control method comprising:

acquiring a VR video captured by an imaging device;

detecting movement of the imaging device;

performing, on a live view image of the VR video, reducing processing to reduce probability of generating a specific symptom to a user viewing the live view image displayed on the display;

determining whether the user is (a) an operator that operates the imaging device and captures the VR video or (b) a viewer of the VR video other than the operator;

controlling a degree of the reducing processing on the live view image based on whether the user is the operator or the viewer, in a case where movement of the imaging device is detected; and controlling the display to display an image obtained after the reducing processing is performed on the live view image, in a case where the reducing processing is performed on the live view image, wherein the reducing processing includes reducing an angle of view of the live view image by replacing a peripheral region of the live view image with a single color image, and wherein the degree of the reducing processing is determined based on a display ratio between (i) a remaining region of the live view image and (ii) the single color image.

19. A non-transitory computer-readable medium that stores a program, wherein the program causes a computer to execute a display control method of controlling a display, the display control method comprising:

acquiring a VR video captured by an imaging device;

detecting movement of the imaging device;

performing, on a live view image of the VR video, reducing processing to reduce probability of generating a specific symptom to a user viewing the live view image displayed on the display;

determining whether the user is (a) an operator that operates the imaging device and captures the VR video or (b) a viewer of the VR video other than the operator;

controlling a degree of the reducing processing on the live view image based on whether the user is the operator or the viewer, in a case where movement of the imaging device is detected; and controlling the display to display an image obtained after the reducing processing is performed on the live view image, in a case where the reducing processing is performed on the live view image, wherein the reducing processing includes reducing an angle of view of the live view image by replacing a peripheral region of the live view image with a single color image, and wherein the degree of the reducing processing is determined based on a display ratio between (i) a remaining region of the live view image and (ii) the single color image.

* * * * *